United States Patent  [15] 3,655,535
Ruehlen et al. [45] Apr. 11, 1972

[54] MULTI-POROSITY ELECTRODE FOR ELECTROCHEMICAL CONVERSION

[72] Inventors: Forrest N. Ruehlen; Homer M. Fox, both of Bartlesville, Okla.

[73] Assignee: Phillips Petroleum Company

[22] Filed: Sept. 24, 1970

[21] Appl. No.: 75,292

Related U.S. Application Data

[63] Continuation of Ser. No. 739,505, June 24, 1968, abandoned.

[52] U.S. Cl. .................................. 204/59, 204/72, 204/246, 204/247, 204/283, 204/294
[51] Int. Cl. ................................................ B01k 3/00
[58] Field of Search ................................. 204/59, 72–81, 204/246, 265, 277

[56] References Cited

UNITED STATES PATENTS

| 2,592,144 | 4/1952 | Howell et al. | 204/247 X |
| 3,280,014 | 10/1966 | Kordesch et al. | 204/74 X |
| 3,461,050 | 8/1969 | Childs | 204/59 |

Primary Examiner—John H. Mack
Assistant Examiner—Neil A. Kaplan
Attorney—Young and Quigg

[57] ABSTRACT

In an electrochemical process, the reaction takes place within the confines of a porous electrode element having a core section which is relatively impervious to the electrolyte and an outer section in contact with the electrolyte which has relatively large pores.

11 Claims, 12 Drawing Figures

PATENTED APR 11 1972
3,655,535
SHEET 1 OF 2
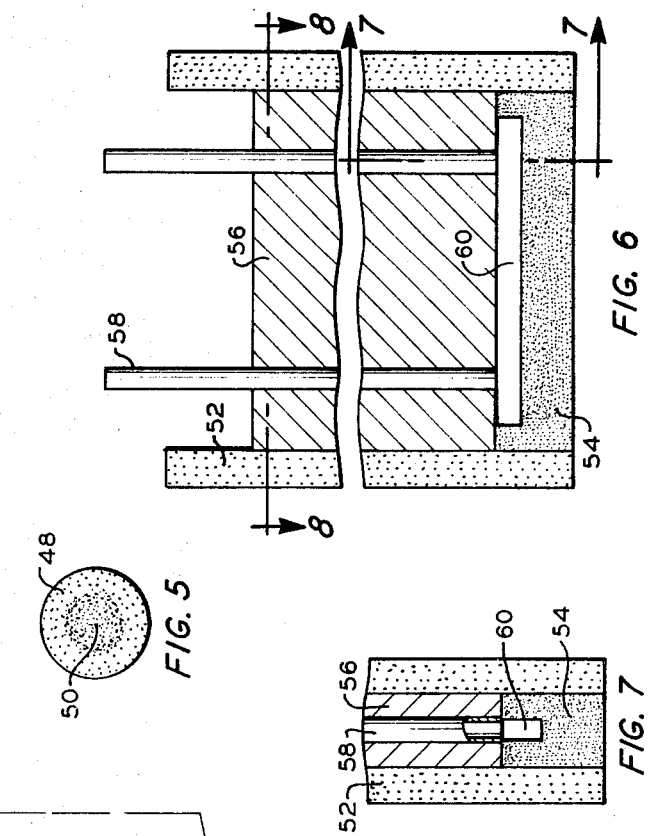
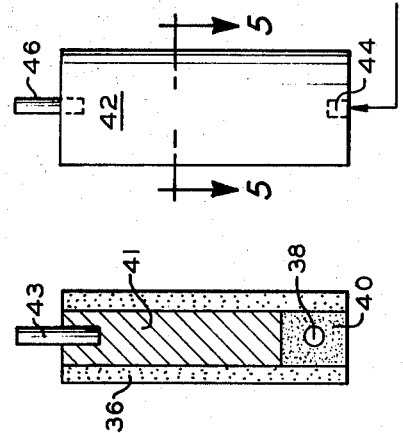
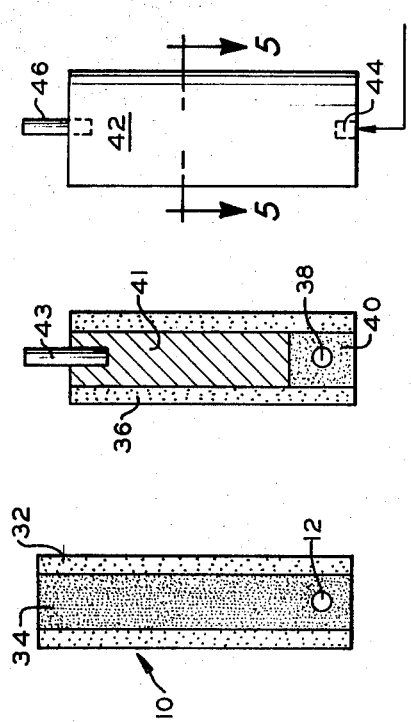
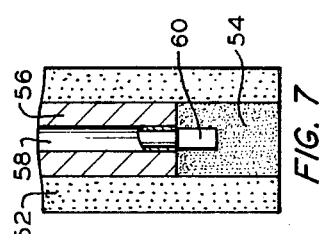
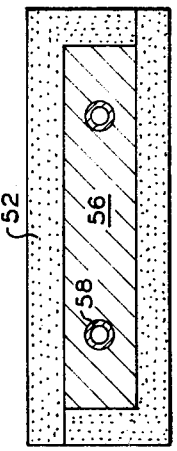
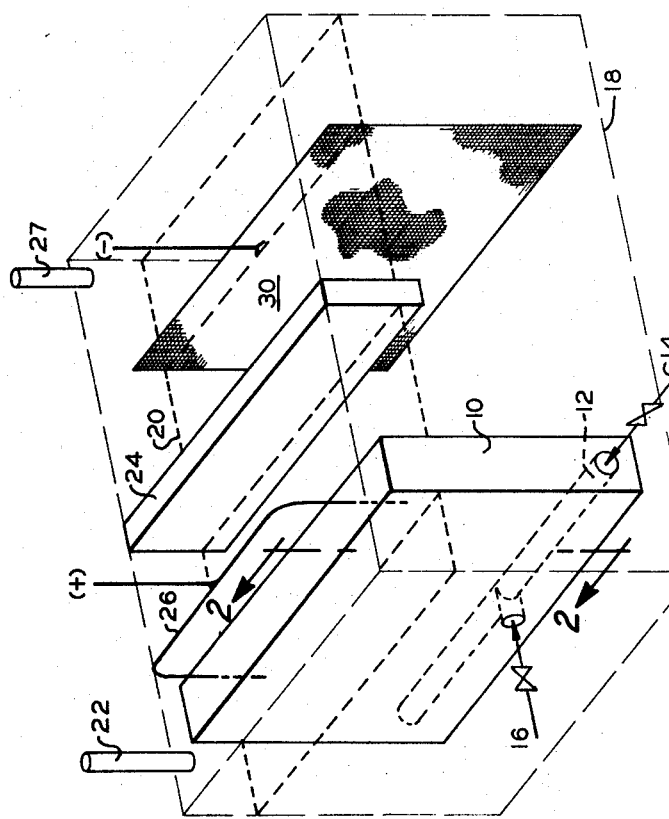
INVENTORS
F. N. RUEHLEN
H. M. FOX
BY
*Young + Quigg*
ATTORNEYS

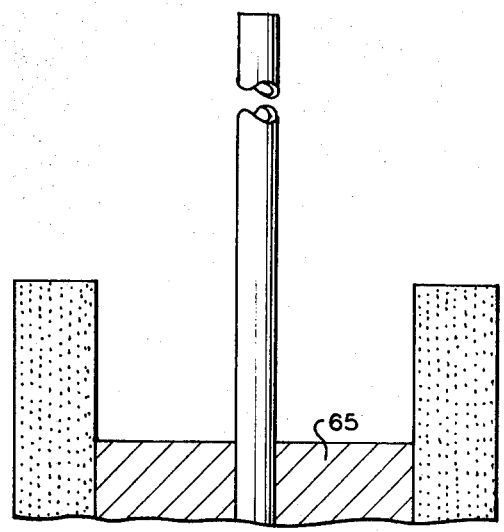
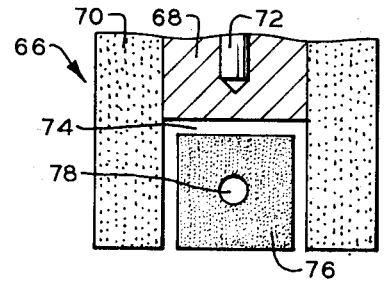
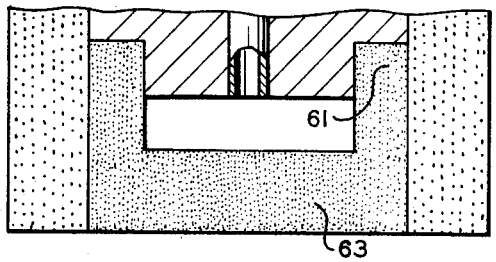
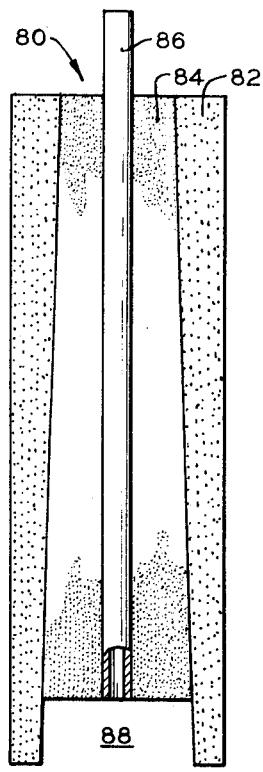
FIG. 9
FIG. 11
FIG. 10
FIG. 12
INVENTORS
F.N. RUEHLEN
H.M. FOX
BY
*Young + Quigg*
ATTORNEYS

MULTI-POROSITY ELECTRODE FOR ELECTROCHEMICAL CONVERSION

This application is a continuation of application Ser. No. 739,505, filed June 24, 1968 and now abandoned.

BACKGROUND OF THE INVENTION

This invention relates to electrode elements and processes for electrochemical conversion.

Porous electrode elements, particularly porous carbon anodes are widely used in electrochemical conversion reactions. Generally, the utilization of such elements has involved immersing the element in an electrolyte and passing an electric current through this electrolyte from this element to an oppositely charged element. At least a portion of the materials within the electrolyte is converted into products at one or both electrodes. In a variation on this process, an additional feedstock for the conversion process is bubbled into the electrolyte through a porous electrode element, such as a porous carbon anode, to produce still different products.

Very recently it has been discovered that the reaction in an electrochemical conversion operation can be carried out within the confines of the porous electrode element itself. This type of operation is of particular utility in electrochemical fluorination because it makes possible a simple one-step route to partially fluorinated products which had previously been difficult to obtain. Carrying out the fluorination reaction within the porous anode, in addition to making possible the direct production of partially fluorinated products, also allows operation at high rates of conversion and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of the feed into the bulk of the electrolyte is avoided.

It is apparent that if the reaction is to take place within the electrode element, larger electrodes are desirable in order to increase the available surface area wherein the reaction takes place. However, with larger electrodes, it has been found that an uneven distribution of feed material can result within the electrode. Non-uniform distribution of the feed material results in a loss of the advantage of this type of operation with respect to the production of only partially fluorinated products; this is because in systems, for instance, utilizing a KF·2HF electrolyte, the fluorinating species are generated continuously throughout the submerged surface of the electrode element and thus, in areas where feed is not distributed properly, the excess of fluorinating species will fluorinate the available feed all the way to perfluoro products, or even produce undesirable cleavage products. Also, non-uniform feed distribution can result in sudden contact of accumulated fluorine with accumulated feed material or with hydrogen from the other electrode element to give an explosive reaction. It can thus be seen that uniform distribution of the feed material and, consequently, uniform contact of the feed material with the electrolyte at the point of reaction are of prime importance.

This problem of non-uniform distribution of the feed can be solved to a large extent by using feed distribution channels in the lower portion of the electrode element. However, these feed distribution channels, unless they are protected in some fashion, can become flooded with electrolyte and plugged in continued usage.

Another problem associated with electrochemical conversion reactions in general is polarization. Polarization or "anode effect," is an incompletely understood phenomenon wherein the resistance of the cell suddenly rises and the cell simply stops operation.

SUMMARY OF THE INVENTION

It is an object of this invention to provide an improved process and apparatus wherein the reaction in an electrochemical conversion process using a porous electrode element is carried out within the confines of the electrode element; it is a further object of this invention to prevent flooding of feed distribution channels in an electrochemical conversion electrode element; it is yet a further object of this invention to provide for uniform distribution of feed through a porous electrode element; it is yet a further object of this invention to provide a porous electrode element for electrochemical conversion reactions having a high ratio of surface to volume in respect to the porous section wherein the reaction occurs; and it is a still further object of this invention to alleviate polarization problems normally associated with electrochemical conversion reactions.

In accordance with this invention a porous electrode element of an electrochemical conversion process comprises a core which is relatively impermeable to the electrolyte and an outer section in contact with the electrolyte which has relatively large diameter pores.

BRIEF DESCRIPTION OF THE DRAWINGS

In the drawings, forming a part hereof, in which like reference characters denote like parts in the various views, FIG. 1 is a schematic representation of an electrochemical cell arrangement utilizing a multi-porosity electrode element in accordance with this invention;

FIG. 2 is a cross-sectional view along section lines 2—2 of FIG. 1;

FIG. 3 is a cross-sectional view of a variable porosity electrode element somewhat similar to that shown in FIGS. 1 and 2;

FIG. 4 is a schematic representation of a variable porosity electrode element having a cylindrical shape;

FIG. 5 is a cross-sectional view along section lines 5—5 of FIG. 4;

FIG. 6 is a cross-sectional view of an electrode in accordance with an alternate embodiment of the instant invention.

FIG. 7 is a sectional view along section lines 7—7 of FIG. 6;

FIG. 8 is a sectional view along section lines 8—8 of FIG. 6;

FIG. 9 is a cross-sectional view of an anode in accordance with another alternate embodiment of the instant invention;

FIG. 10 is a side elevation of an electrode in accordance with another alternate embodiment of the instant invention;

FIG. 11 is a sectional view of the lower portion of a multiporosity rectangular electrode element having a sparger; and FIG. 12 is a cross section of a cylindrical electrode element having tapered sections.

DESCRIPTION OF THE PREFERRED EMBODIMENTS

The pore size of the core section must be within the range of about 0.01 to 35, preferably 0.1 to 10, microns average diameter with no significant amount of pores having a diameter exceeding 70 microns. The pore size of the section of the electrode element in contact with the electrolyte must be within the range of about 40 to 150, preferably 50 to 120, microns average pore diameter. The permeability of the core section is generally within the range of about 0.001 to 4, preferably 0.02 to 0.5, darcys. The permeability of the section of the electrode element in contact with the electrolyte is generally within the range of about 5 to 75, preferably 10 to 70, darcys.

In the operation of the invention, the electrolyte must be non-wetting to the electrode, that is, the contact angle between the electrolyte and the electrode material must exceed 90° in order that anticapillary forces will prevent substantial impregnation of the small pores of the porous element by the electrolyte. Non-wetting electrolyte-electrode combinations can be obtained simply by a suitable choice of these cell components. For example, the metal fluoride-containing HF electrolytes commonly used in fluorine generation or in electrochemical fluorination are non-wetting to carbon electrodes. If an electrode material is wetted by an electrolyte, it can be conventionally treated with a wet-proofing agent.

The feed material is introduced through, or adjacent to, the core section which is essentially free of electrolyte. Said feed is thereby distributed uniformly to the large pore sections of the element thus avoiding the sparking, overfluorination, degradation of the feed, explosion and the like which result from non-uniform feed distribution. No significant amount of electrolyte can enter the core section. While it is not desired to limit the invention to any theory of operation, it is believed that the electrolyte partially penetrates the porous electrode element through some of the larger pores. The feed material is introduced uniformly throughout the large pore section which is only partially filled with electrolyte, where it migrates to near the outer surface to form a three-phase boundary of feed, electrolyte and electrode element, at which point the reaction takes place. The product and unreacted feed then migrate up to the portion of the electrode element above the electrolyte level where they are collected, without ever having broken out into the bulk of the electrolyte.

In addition to the elimination of the problem of the electrolyte invasion of electrode cavities, the electrode of the present invention offers still other advantages. For example, the sandwich construction permits the use of relatively thin sections of the large pore carbon. This is an advantage since it improves the surface to volume ratio for the carbon in which the fluorination takes place thus providing a more uniform contact of the fluorination species and feed material. Heretofore, thin reaction sections of this relatively porous material were not practical because they had insufficient mechanical strength. The sandwich construction now provides this strength and reaction sections having a thickness, for example, of about 1 inch or less, even 0.5 inch or less, can be utilized, in many instances, with substantial advantage.

The optimum surface to volume ratio of the reaction section will depend upon a number of factors among which are the desired degree of conversion and the depth of the electrode immersion. For example, in the electrochemical fluorination of a feedstock such as ethylene dichloride, a surface to volume ratio of about 2 in.$^{-1}$ is satisfactory when the electrode immersion is about 12 inches and the hydrogen conversion is about 50 per cent. Ordinarily, surface to volume ratios from about 1 to about 3 in.$^{-1}$ are used but, as mentioned above, this is dependent upon other conditions, and ratios above and below this range can frequently be used. For example, surface to volume ratios of up to about 10 in.$^{-1}$ can be used with some combination of conditions which include very shallow electrode immersions. The surface to volume ratio is computed as the electrogeometric surface, in square inches, of the reaction section divided by the volume, in cubic inches, of the reaction section. The electrogeometric surface is the geometric working surface, of the higher pore diameter reaction section, which is below the electrolyte level and actually in contact with the bulk of the electrolyte. The volume of the reaction section is simply the geometric volume which is below the electrolyte level and exclusive of the volume of the core components.

Still another advantage is that a much improved electrical contact between the current collector and the electrode is obtained when carbon electrodes are used. The current collector or electrode terminal generally consists of a metal pin inserted into the carbon and it has been found that a much better electrical connection, as indicated by a much smaller voltage drop across the connection, is obtained by inserting the current collectors into the more dense, less porous carbon material. Furthermore, this protects the metallic current collectors from corrosion and allows them to be inserted deeper for even better contact due to the fact that the less permeable core is not penetrated by electrolyte. Thus, in addition to containing the cavities associated with the introduction and distribution of the feed materials, it is convenient and advantageous to make the electrical contact with the center, less porous carbon section. Even greater improvement in electrical contact is obtained in embodiments as shown in FIG. 3 where the current collector is imbedded in the conductive nonporous slab.

In embodiments such as are shown in FIGS. 3 and 6 to 9 a third grade of material is used to form the upper portion of the core section in which the current collector is embedded. This third grade of material can be completely impervious, serving only as a support for the current collector and the porous slabs of carbon. It can be made of any impermeable conductive material inert to the system; a preferred material is solid nonporous carbon. Metal and the like can also be used. As is well known, even solid "impervious" carbon is penetrated to a very slight extent by a gaseous medium over an extended period of time. Thus by "nonporous carbon" is meant solid carbon which is substantially impervious.

Still another advantage is that the use of the more porous carbon for the outer section of the electrode is more convenient in that it generally suffers less from polarization. Polarization, also called "anode effect," is the incompletely understood phenomenon wherein the cell simply stops operating and must be depolarized by the application of brief but extremely high voltage. Such polarizations are experienced less frequently when the more highly porous carbons are in contact with the electrolyte than when the more dense carbons are so situated. In general, when a "single porosity" electrode element is used polarization occurs frequently when a small pore size is utilized. The use of a larger pore size alleviates this problem but often causes electrolyte invasion of the feed ports and/or distribution passageways, with a resultant clogging of these passageways. Surprisingly, by utilizing the dual porosity concept of this invention both electrolyte invasion and polarization can be overcome. It is most unexpected that the use of small particle size material in the core section, which causes polarization in "single porosity electrodes" does not cause polarization in the multi-porosity electrode of this invention.

Yet another advantage of the instant invention is that feed distribution passageways can be provided in the lower portion of the core section so as to allow the production of large electrode elements having uniform distribution of feedstock throughout. The small pore size of the core portion prevents electrolyte invasion of such passageways which otherwise would occur and ultimately result in increased anode pressure and/or plugging of these passageways with a material which is solid at the operating temperatures.

The porous portions of the porous elements of the electrode assemblies of the invention can be fabricated from any suitable conducting porous electrolyte resistant material which is compatible with the system, e.g., nickel, iron, various metal alloys, and carbon, which is not wetted by the electrolyte. Porous carbon, which is economical and readily available in ordinary channels of commerce, is presently preferred for said porous element. In many instances it is advantageous to provide a metal element in contact with the porous carbon element. For instance, a porous carbon anode can have a nickel screen wrapped around it. Various grades of porous carbon can be used in the practice of the invention. For the section of the electrode element in contact with the electrolyte, it is preferred to employ porous carbon which has been made from carbon produced by pyrolysis, and not graphitic carbon. The electrodes of the invention can be fabricated in any suitable shape or design, but must be arranged or provided with a suitable means for introducing the feed reactant material into the pores of the porous element thereof.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like, can frequently be employed for the cell body. When a nonporous cathode or a nonporous anode is employed which is not fabricated in accordance with this invention (along with a porous anode or a porous cathode of the invention), said nonporous cathode or nonporous anode can be fabricated in any suitable shape or design and can be made of any suitable conducting material such as iron, steel, nickel, alloys of said metals, carbon and the like. For example, said nonporous cathode can be fabricated from a metal screen or gauze, a perforated plate, and can have a shape complementary to the shape of the porous anode.

The electrode assemblies of the invention can be employed in a wide variety of electrochemical conversion processes in which the porous electrode is not wetted by the particular electrolyte being used, and wherein the reaction takes place within the electrode. Some examples of such processes are electrochemical halogenation, electrochemical cyanation, and cathodic conversions such as the reduction of alcohols to hydrocarbons or the reduction of acids to alcohols. One electrochemical conversion process in which the electrode assemblies of the invention are particularly valuable is the electrochemical fluorination of fluorinatable materials in the presence of an essentially anhydrous liquid hydrogen fluoride-containing electrolyte. Thus, for purposes of convenience, and not by way of limitation, the electrode assemblies of the invention are primarily described in terms of being employed as an anode in the electrochemical fluorination of fluorinatable materials when using said hydrogen fluoride containing electrolyte.

As referred to hereinabove, the instant invention is applicable to electrochemical conversion reactions wherein a current-conducting essentially anhydrous liquid hydrogen fluoride electrolyte is electrolyzed in an electrolysis cell provided with a cathode and a porous anode (preferably porous carbon), a fluorinatable organic compound is introduced into the pores of said anode and therein at least a portion of said organic compound is at least partially fluorinated within the pores of said anode, and fluorinated compound products are recovered from said cell. The present invention provides improved electrode assemblies which are especially suited to be employed as anodes in such process to produce partially fluorinated materials and/or to fluorinate organic compounds with little or no scission of carbon to carbon bonds.

Very few organic compounds are resistant to fluorination. Consequently, a wide variety of feed materials, both normally liquid and normally gaseous compounds, can be used as feedstocks in this process. Organic compounds which are normally gaseous or which can be introduced in gaseous state into the pores of a porous anode under the conditions employed in the electrolysis cell, and which are capable of reacting with fluorine, are presently preferred as starting materials. However, starting materials which are introduced into the pores of the anode in liquid state can also be used. Generally speaking, desirable organic starting materials which can be used are those containing from one to eight, preferably one to six, carbon atoms per molecule. However, reactants which contain more than six or eight carbon atoms can also be used. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, argon, krypton, neon, xenon, nitrogen, etc. Normally gaseous materials such as hydrocarbons containing from one to four carbon atoms can also be used as carrier gases. These latter gases will react, but in many instances this will not be objectionable. The above-described carrier gases, and particularly said inert gases, can also be used as diluents for the feedstocks which are normally gaseous at cell operating conditions.

Some general types of starting materials which can be used include among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from one to six carbon atoms per molecule. The presently more preferred starting materials are the normally gaseous organic compounds, and particularly said saturated and unsaturated hydrocarbons, containing from one to four carbon atoms per molecule.

Since fluorine is so reactive, no list of practical length could include all starting materials which can be used. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexene-2; butadiene; vinyl chloride; 3-fluoropropylene; acetylene; methylacetylene; vinylacetylene, 4,4-dimethylpentyne-2; allyl chloride; methylamine; ethylamine; diethylamine; 2-amino-3-ethylpentane; 3-bromopropylamine; triethylamine; dimethyl ether; diethyl ether; methylethyl ether; methyl vinyl ether; 2-iodoethyl methyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanenitrile; methanol; ethanol; isopropanol; n-hexanol; 2,2-dimethylhexanol-3; n-butanol; ethylenebromohydrin; benzene; toluene; cumene; o-xylene; p-xylene; and monochlorobenzene.

In addition to such fluorinatable organic materials described above, carbon monoxide and oxygen can be used as feedstocks to provide carbonyl fluoride and oxygen difluoride respectively.

The electrochemical fluorination process is carried out in a medium of hydrogen fluoride electrolyte. Although said hydrogen fluoride electrolyte can contain small amounts of water, such as up to about 5 weight per cent, it is preferred that said electrolyte be essentially anhydrous. The hydrogen fluoride electrolyte is consumed in the reaction and must be either continuously or intermittently placed in the cell.

Pure anhydrous liquid hydrogen fluoride is nonconductive. The essentially anhydrous liquid hydrogen fluoride described above has a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulphuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas KF·2HF, KF·3HF, or KF·4HF. Such electrolytes can be conveniently prepared by adding the required quantity of hydrogen fluoride to KF·HF (potassium bifluoride). In general, said additives are not consumed in the process and can be used indefinitely. Said additives are frequently referred to as conductivity additives for convenience.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from minus 80° to 500° C. at which the vapor pressure of the electrolyte is not excessive, e.g., less than 250 mm Hg. It is preferred to operate at temperatures such that the vapor pressure of the electrolyte is less than about 50 mm Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60° to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure. It should be pointed out that a valuable feature of the process is that the operating conditions of temperature and pressure within the limitations discussed above are not critical and are essentially independent of the type of feed employed in the process.

For purpose of efficiency and economy, the rate of direct current flow through the cell is maintained at a rate which will give the highest practical current densities for the electrodes employed. Generally speaking, the current density will be high enough so that anodes of moderate size can be employed, yet low enough so that the anode is not corroded or disintegrated under the given current flow. Current densities within the range of from 30 to 1,000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide, voltages in the range of 4 to 20 volts per unit cell can be used.

As used herein the term "anode geometric surface" refers to the outer geometric surface area of the porous carbon element of the anode which is exposed to electrolyte and does not include the pore surfaces of said porous element.

The feed rate of the fluorinatable material being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Gaseous feed rates which can be employed will preferably be in the range of from 0.5 to 10, milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). On this basis, for a typical anode the above range would be 25 to 500 milliliters per minute per square centimeter of cross-sectional area.

The actual feed rate employed will depend upon the type of carbon used in fabricating the porous element of the anode as well as several other factors including the nature of the feedstock, the conversion desired, current density, etc., because all these factors are interrelated and a change in one will affect the others. The feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these flow rate conditions there is established a pressure balance between the feedstock entering the pores of the anode from one direction and electrolyte attempting to enter the pores from another and opposing direction. This pressure balance provides an important feature in that essentially none of the feed leaves the anode to form bubbles which escape into the main body of the electrolyte. Essentially all of the feedstock and/or reaction product travels within the carbon anode via the pores therein until it reaches a collection zone within the anode from which it is removed via a conduit, or until it exits from the anode at a point above the surface of the electrolyte.

The more permeable carbons will permit higher flow rates than the less permeable carbons. Similarly, electrode shapes, electrode dimensions, and manner of disposition of the electrode in the electrolyte will also have a bearing on the flow rate. Thus, owing to the many different types of carbon which can be employed and the almost infinite number of combinations of electrode shapes, dimensions, and methods of disposition of the electrode in the electrolyte, there are no really fixed numerical limits on the flow rates which can be used. Broadly speaking, the upper limit on the flow rate will be that at which "breakout" of feedstock and/or fluorinated product begins along the immersed portion of the electrode element. Unless otherwise specified, "breakout" is defined as the formation of bubbles of feedstock and/or fluorinated product on the outer immersed surface of the electrode element with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the gaseous flow rates can be within the range of from 3 to 600, preferably 12 to 240, cc (STP) per minute per square centimeter of cross-sectional area (taken perpendicular to the direction of flow).

Although the electrolyte is non-wetting, there will be some penetration of the larger pores of the electrode element by the hydrogen fluoride electrolyte as previously noted. The amount of said penetration will depend upon the pore size and other factors. The larger size pores are more readily penetrated. It has been found that porous carbon anodes as described herein can be successfully operated when up to about 40 or 50 per cent of the pores have been filled by liquid HF electrolyte.

The feed material and the products obtained therefrom are retained in the cell for a period of time which is generally less than one minute. Because the residence time is comparatively short and is especially uniform, the production of the desired products is facilitated. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen, produced at the cathode, can be burned to provide heat energy or can be utilized in hydrogen-consuming processes such as hydrogenation, etc.

Referring now to the drawings, particularly FIG. 1, there is shown in schematic representation a complete electrochemical conversion cell having a porous electrode element 10 having the general shape of a rectangular block. A first passageway 12 extends longitudinally into and substantially across said block adjacent the lower end thereof. The interior wall of said passageway 12 comprises a first surface for the introduction of a feed material from first conduit 14 into the pores of said porous element 10. Depending upon the size and configuration of porous element 10, more than one passageway 12 can be provided. Also, if desired, the feedstock can be introduced into the center of passageway 12 by means of conduit 16. Said porous element 10 is disposed in a cell container 18. The upper end of said porous electrode element is above the level of the electrolyte in said container as depicted by reference character 20. Thus, the upper end surface of porous electrode element 10 comprises a second surface for withdrawing unreacted feedstock and product from the pores of the porous electrode element 10. Conduit 22 comprises a second conduit means for withdrawing product and unreacted feedstock from within the pores of porous electrode element 10. If desired, the space above the electrolyte can be divided by a partition 24 extending from the top of the cell to below the level of the electrolyte to keep the anode products separated from the cathode products; or, a conventional cell divider can be employed to divide the cell into an anode compartment and a cathode compartment. However, such a divider is not essential. A current collector 26 comprising a pair of metal bars extends into the top portion of porous electrode element 10. A cathode 30, fabricated of any suitable metallic material such as a screen, perforated plate, etc., is disposed in said cell as indicated. Cathode products can be removed via conduit 27.

FIG. 2 is a cross section along section lines 2—2 of FIG. 1. Here is shown in cross section porous electrode element 10 having an outer section 32 having relatively large pores and a core section 34 having relatively small pores.

FIG. 3 shows a variation of the novel porous electrode element of the instant invention, also in section, wherein there is provided an outer section 36 having relatively large pores; a first passageway 38 for distribution of feed; and a core section of relatively small pore diameter material 40 at the bottom of said core surrounding said passageway and an upper extension 41 of core section 40, said upper extension being made of nonporous carbon. Current collector 43 is embedded in nonporous section 41.

FIG. 4 shows another alternative embodiment of the porous electrode element of the instant invention wherein said element is cylindrical. This cylindrical porous electrode element 42 has a feed port 44 at the lower end thereof and a current collector 46 at the upper end thereof. Referring now to FIG. 5 the cylindrical electrode element of FIG. 4 is shown in cross section to reveal the outer section 48 having relatively large pores which gradually blends into a core section 50 having relatively small pores. It is apparent that the feed introduced through feed port 44 is initially introduced into this small pore size core section, the larger pore size outer section being in contact with the bulk of the electrolyte.

The product and any unreacted feedstock is withdrawn, for instance, by a conduit such as conduit 22 of FIG. 1 which is in communication with the upper portion of the porous electrode element. Communication between conduit 22 and porous electrode element 10 can be by means of a hood over the portion of porous electrode element 10 which is above the surface of the electrolyte (not shown) or it can be by means of a second passageway in the upper portion of said porous electrode element for collecting said products, said second passageway being similar to the first passageway in the bottom of the electrode element through which the feedstock is introduced.

Referring now to FIGS. 6 to 8 there is shown an electrode element having an outer relatively high pore diameter carbon section 52, a core section having a bottom portion 54 of relatively low pore diameter carbon and an upper portion 56 of impermeable carbon. Embedded in upper portion 56 are two hollow copper stems 58 which serve as conduits to introduce the feed materials into first passageway 60. These stems also serve as current collectors.

Referring now to FIG. 9, there is shown in section an anode similar to that shown in FIGS. 6–8 except that projections 61 of fine pore bottom section 63 extend upward into recesses in portion 65 of the core.

Referring now to FIG. 10 there is shown an electrode element in accordance with an alternative embodiment of the instant invention having a first passageway 62 for the introduction of feed materials and a second passageway 64 in the upper portion of the electrode element for collecting the reaction products.

As used throughout the specification and claims, the term "core" refers to a central section, either a cylinder surrounded on all sides (but not necessarily the top and bottom) by a porous material, for instance as shown in FIG. 5, or else a slab surrounded on at least both flat sides (but not necessarily the ends and top and bottom) by a porous material, for instance as shown in FIG. 8. This core may be composed entirely of a relatively low pore diameter material or may comprise a section of nonporous material and a section of relatively low pore diameter material.

Referring now to FIG. 11, there is shown the lower portion of a multiporosity electrode element 66 having a core of impervious carbon 68 and outer section 70 of relatively large pore diameter carbon. Embedded in core 68 is metallic current collector 72. Slab section 70 extends below core 68 along the sides so as to define a cavity 74 which is open to the bulk of the electrolyte. Slabs of relatively large pore diameter carbon are also present along the ends and may also extend below core 68 so as to define a cavity closed on five sides, or the large pore diameter slabs along each end can end at a point even with the bottom of core 68 so as to define a trough-like cavity open at the bottom and also at each end. Disposed within this cavity is sparger 76. Feed is introduced into sparger 76 through channel 78 which is closed at one end and open to the source of feed at the other. Sparger 78 is generally made of very small pore diameter carbon in which case the entire electrode comprises three grades of carbon, large pore diameter outer section 70, small pore diameter sparger 76 and relatively impervious core 68.

Referring now to FIG. 12 there is shown a cross-sectional view of a cylindrical electrode 80 having an outer relatively large pore diameter section 82 which tapers so as to be thicker at the top than at the bottom, and core section 84 of relatively small pore diameter carbon which tapers in a manner complementary to that of section 82. Disposed within core 84 is metal pipe 86 which serves as current collector and also as a means to introduce the feed into cavity 88. These tapers result in a better mechanical fit and hence a better electrical connection.

Many conventional parts, such as temperature controllers, electrical connections, insulation, framework, and the like, are not shown for the purpose of simplicity, but their inclusion is understood by those skilled in the art and is within the scope of the invention. Similarly, the schematic representations show relative dimensions which may or may not be optimum for specific situations. For example, the distance between anode and cathode can be much smaller than what is illustrated.

EXAMPLE I

A porous carbon anode was constructed using two different types of porous carbon. The carbon which was used for the core was a relatively dense porous carbon which contained pores ranging from 0.1 to about 10 microns and averaging about 3 microns. It had a permeability of about 0.056 darcys and had a total porosity or void space of about 30 per cent. The outer section was a porous carbon which had pores ranging from about 10 to about 100 microns, the average pore size being about 55 microns. The permeability was about 20 darcys and the total porosity or void space of this material was about 51 per cent.

A slab of low pore diameter carbon measuring 6 × 12 × ¾ inches was bonded between two pieces of higher pore diameter carbon material which measured 6 × 14 × ⅜ inches using a commercial carbon cement. This laminate was dried overnight in a forced draft oven at 215°–220° F. The bottom 2 inches of the 14-inch long higher pore diameter carbon sections extended below the 12-inch-long inner core and formed a channel for the feed section. The feed section was another piece of the low pore diameter carbon measuring 1 × 6 × ¾ inches and containing a 5/16-inch lateral hole for introduction and distribution of the feed. The lower edge of this feed section was located even with the lower edge of the higher pore diameter carbon skirt, being held in position by Teflon end plates fastened to both the feed section and the electrode proper. A void measuring 6 × 1 × ¾ inches thus remained between the feed section and the electrode. Two copper current collectors were conventionally mounted within the core, extending about 5 inches into the low pore diameter carbon.

The above-described anode was used in the electrochemical fluorination of ethylene dichloride using 8–9 volts, 200 ma/cm$^2$, an iron mesh cathode, and an electrolyte comprising KF·2HF maintained at about 96° C. The anode was immersed 12 inches into the electrolyte. The cell operated satisfactorily for about 5 days, converting the ethylene dichloride to substantial amounts of dichlorotetrafluoroethane (Freon 114). Hydrogen was evolved at the cathode. During this period, the electrical resistance due to the connection between the current collector and the carbon core was periodically measured and found to range from about 50 to about 80 mv per pin. This was significant improvement over other such connections such as the connection between the copper pin and higher pore diameter carbon. The voltage loss using the latter connections ranges from about 300–600 mv under comparable conditions.

EXAMPLE II

The above example was repeated except that the anode was modified by sawing off the skirts of the outermost sections which extended on either side of the low pore diameter carbon core. Instead of the feed section suspended beneath the low pore diameter carbon core, a 5/16-inch lateral hole was drilled into the core about three-fourth inch from the bottom. The ethylene dichloride feed material was introduced into the anode through this lateral. The electrode, thus, was of the type shown in FIG. 1.

This modification of the anode was operated successfully for several hours under essentially the same conditions described above and with satisfactory results.

EXAMPLE III

A uniform large pore diameter anode (pore diameter similar to that of the outer sections of the electrode elements of the instant invention), 6 × 1.5 × 12 inches in size, was used in an electrochemical conversion reaction to convert ethylene dichloride as in the above examples. To provide a current flow of 200 amps/square foot, a difference in potential across the electrodes of 8.6 volts was required. This electrode was then replaced with an electrode of the instant invention (Electrode A) having a relatively impermeable ¾-inch core of graphite and the required voltage was reduced to 7.7. With an electrode similar to Electrode A except with a relatively impermeable carbon core (Electrode B), the voltage required was 7.8. With a cylindrical electrode 4 inches in diameter and 12 inches long, with a 2-inch diameter core of relatively impermeable graphite (Electrode C), the voltage required was 7.5. For a current density of 300 amps/square foot, the control electrode required a voltage of 10.05; Electrode A, 8.9; Electrode B, 9.05; and Electrode C, 8.85. This improved electrical efficiency represents a savings at going prices for electricity in a 50 million pound/year commercial plant of about $300,000 per year.

While this invention has been described in detail for the purpose of illustration, it is not to be construed as limited thereby but is intended to cover all changes and modifications within the spirit and scope thereof.

We claim:

1. A process for the electrochemical conversion of a feedstock, which process comprises: passing an electric current through a current-conducting electrolyte composition contained in an electrolysis cell provided with a first electrode element and a porous second electrode element, which porous electrode element is not wetted by said electrolyte, said porous electrode element having a core section, at least the lower portion of which has relatively small size pores, and an outer section, in contact throughout most of its surface with said electrolyte, which outer section has relatively large size pores; passing said feedstock into said small pore size core through a first surface thereof at a point adjacent the bottom of said core and thereafter into the large pores of said outer section and therein at least partially reacting at least a portion of said feedstock; and recovering product and any remaining unreacted feedstock from within the pores of said porous electrode element from a second surface, said second surface being spaced apart from said first surface.

2. A process according to claim 1 wherein said first electrode element is an anode and said second porous electrode element is a cathode.

3. A process according to claim 2 wherein: said core section of said cathode has an average pore diameter within the range of from 0.01 to 35 microns; and said outer section of said cathode has an average pore diameter within the range of from 40 to 150 microns.

4. A process according to claim 3 wherein: the permeability of said core section is within the range of from 0.001 to 4 darcys; and the permeability of said outer section is within the range of from 5 to 75 darcys.

5. A process according to claim 4 wherein said core section comprises porous carbon and said outer section comprises porous carbon.

6. A process for the electrochemical conversion of an organic compound feedstock, which process comprises: passing an electric current through a current-conducting electrolyte composition contained in an electrolysis cell provided with a cathode and a porous anode which porous anode is not wetted by said electrolyte, said anode having a core section, at least the lower portion of which has relatively small size pores, and an outer section, in contact throughout most of its surface with said electrolyte, which outer section has relatively large size pores; passing said feedstock into said small pore size core through a first surface thereof at a point adjacent the bottom of said core and thereafter into the larger pores of said outer section and therein at least partially reacting at least a portion of said feedstock; and recovering product and any remaining unreacted feedstock from within the pores of said anode from a second surface, said second surface being spaced apart from said first surface.

7. A process according to claim 6 wherein: said core section of said anode has an average pore diameter within the range of from 0.01 to 35 microns; and said outer section of said anode has an average pore diameter within the range of from 40 to 150 microns.

8. A process according to claim 7 wherein: the permeability of said core section is within the range of from 0.001 to 4 darcys; and the permeability of said outer section is within the range of from 5 to 75 darcys.

9. A process according to claim 8 wherein: said core section comprises porous carbon; said outer section comprises porous carbon; said electrolyte composition comprises essentially anhydrous liquid hydrogen fluoride; and wherein at least a portion of said feedstock is at least partially fluorinated.

10. A process according to claim 9 wherein said feedstock is initially passed into a feed distribution passageway within the lower portion of said core section.

11. A process according to claim 9 wherein said anode is immersed in said electrolyte to a depth of greater than 6 inches.